June 19, 1956 S. G. SYLVAN 2,751,042
MECHANICAL DRY TUBULAR-STOCKING DUST COLLECTOR
OF THE TRAVERSING REVERSE-JET BLOW RING
OR SELF-CLEANING TYPE
Filed June 22, 1953 2 Sheets-Sheet 1

INVENTOR.
STIG G. SYLVAN

BY
ATTORNEY

June 19, 1956 S. G. SYLVAN 2,751,042
MECHANICAL DRY TUBULAR-STOCKING DUST COLLECTOR
OF THE TRAVERSING REVERSE-JET BLOW RING
OR SELF-CLEANING TYPE
Filed June 22, 1953 2 Sheets-Sheet 2
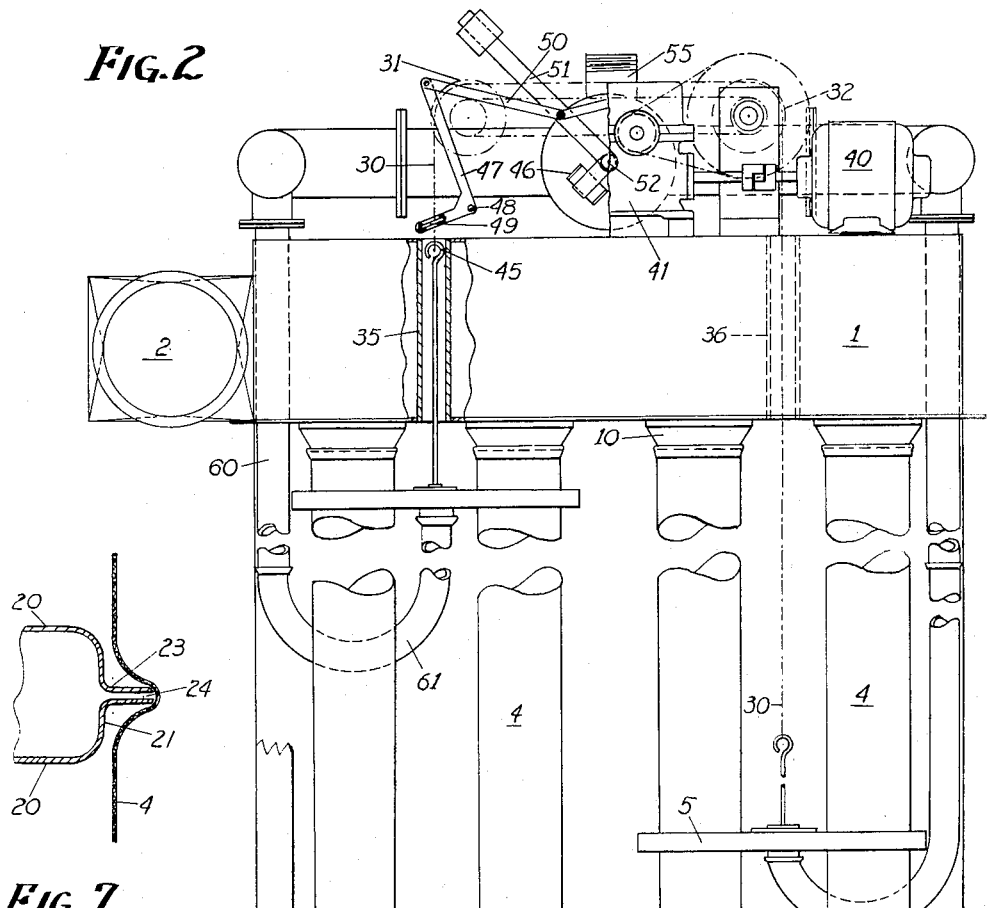
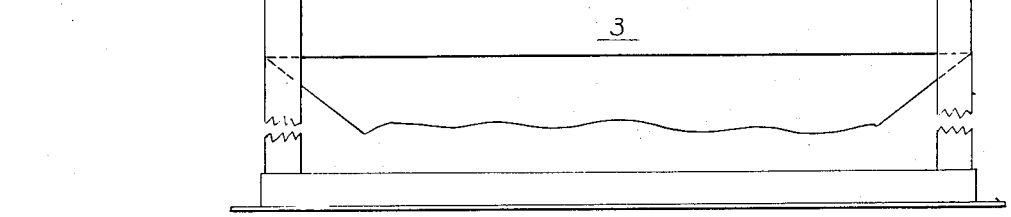
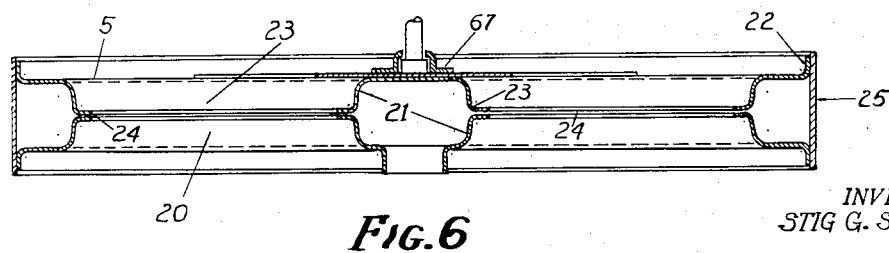
INVENTOR.
STIG G. SYLVAN
BY
Arthur F. Robert
ATTORNEY United States Patent Office 2,751,042
Patented June 19, 1956

2,751,042

MECHANICAL DRY TUBULAR-STOCKING DUST COLLECTOR OF THE TRAVERSING REVERSE-JET BLOW RING OR SELF-CLEANING TYPE

Stig G. Sylvan, Louisville, Ky., assignor to American Air Filter Company, Inc., Louisville, Ky., a corporation of Delaware Application June 22, 1953, Serial No. 363,322

6 Claims. (Cl. 183—61)

This invention relates to mechanical dry tubular-stocking dust collectors of the traversing reverse-jet blow ring or self-cleaning type.

In dust collectors of this type, the air enters a vertically arranged tube or stocking axially, usually at the upper end, and is cleaned as it discharges radially outward through the fabric of the tube. As the air flows, the tube is traversed back and forth along its length by an encircling blow ring which jets an annular sheet of high pressure gas into the tube to force the accumulated dust from its inner surface, the dust thus removed ultimately being discharged axially from the lower end of the tube into a hopper or other dust receiving system.

The principal object of this invention is to improve this jet type of cleaner in a manner such as to facilitate its manufacture, improve its operation and reduce its maintenance.

More specifically the objects are: to improve the connections between the ends of the tube and the header and hopper respectively to facilitate the installation and removal of the tubes, to accommodate lengthwise expansion and contraction of the tubes and to maintain an adequate seal; and to improve the blow ring structure and arrangement so as to reduce manufacturing cost, the wear on the tubes and the operating power cost.

The invention is illustrated in the accompanying drawings wherein:

Figure 2 is an elevational view looking at the right side of the collector as it appears in Figure 1;

Figure 6 is a sectional view of the blow ring; and

Figure 7 is a detail view showing the operative relationship of a tube to the blow ring.

Figure 1:
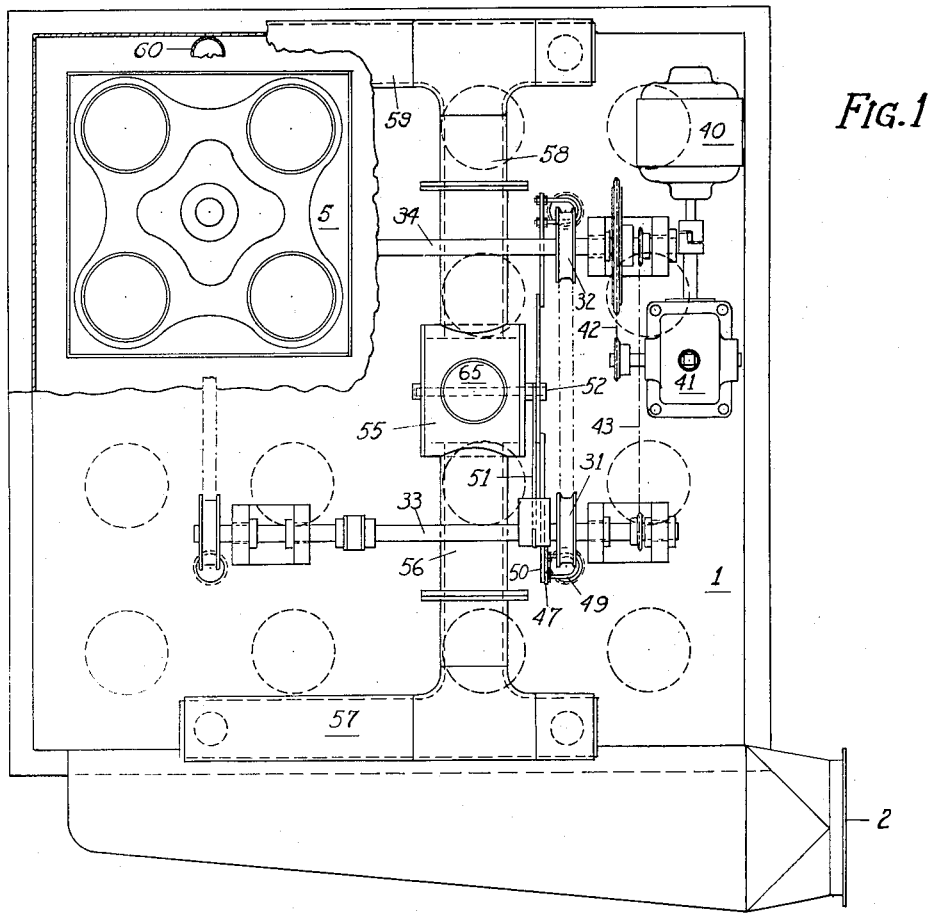
Figure 1 is a partly broken view of a dust collector embodying the present invention.

Dust collectors, of the type illustrated in the drawings, are exemplified by the collectors shown in U. S. patent to Hersey, 2,495,635. The collector, specifically illustrated in the drawings conventionally comprises: an upper sheet metal inlet header 1 having a side inlet opening 2 to receive the gas to be cleaned and a series of gas outlet openings in its bottom wall; a bottom sheet metal dust hopper 3, having, in its upper wall, a series of openings corresponding to the header outlet openings; a series of cylindrical fabric filter elements or tubes 4 extending from the header substantially to the hopper, each tube having a sealed connection at its upper and lower ends with the header and hopper respectively and operating to receive dusty gas axially from the header and to discharge clean gas radially into the surrounding atmosphere or casing and ultimately discharging the separated dust axially downward into the hopper; one or more traversing reverse-jet blow rings 5 providing a nozzle for each tube, each nozzle being arranged to jet an annular sheet of high pressure gas reversely through the tube fabric in order to dislodge the deposited dust from the inner face of the tube; drive means for reciprocating the blow rings upwardly and downwardly along their respective tubes; means for supplying gas under relatively high pressure to the blow rings; and interrupting means for shutting off the flow of high pressure gas to each blow ring during its upstroke.

In service it is necessary to remove individual tubes from time to time for various purposes such as inspection, repair, replacement, etc. Heretofore, this has been a troublesome operation because the limited access to the upper ends of the tubes usually restricts the performance of this operation to a single person and normally requires that person to work at arms length with his hands overhead while the heaviness of the tube makes it difficult for that person to support the tube in such position and at the same time manipulate even the simplest clamp or other mechanical fastening means normally employed to secure it to the header.

In accordance with one feature of the present invention, the foregoing difficulties are minimized by a very simple mounting arrangement which permits each tube to be grasped at its mouth for supporting purposes and to be attached to or removed from the header by a simple manipulation of the mouth of the tube. The tube mounting arrangement employed for each tube comprises: a gas outlet nipple or tube connector 10 rigidly mounted on the header to provide an outlet opening therefor, this connector having, adjacent its outlet end, a neck also designated 10 and a circumferential flange 11 extending laterally outward from the neck and terminating in an outer rim, the flange 11 providing a circumferential seat; and a filter tube 4 having a diameter large enough to fit over the rim of flange 11, at its upper end and a flexible mouth of smaller diameter centered on the seat provided by flange 11. Preferably the tube 4 is of uniform diameter throughout its extent but its upper mouth is reduced to a diameter slightly smaller than the diameter of the rim of flange 11 by any suitable means such as an attachment ring 12 encircling the mouth of the tube and secured to it.

The attachment ring 12 may be composed of any suitable material, such as hemp, fabric, metal or plastic, fashioned in the form of an endless rope or chain. Preferably the mouth of the tube is folded, either inwardly or outwardly, over the ring and the folded material then sewn to the tube proper to enclose the ring. With this arrangement, a tube may be attached to the header simply by placing one portion of the attachment ring 12 over the rim of flange 11 and offsetting it inwardly toward the nipple 10 sufficiently to allow the opposite portion of the ring to be slipped over the opposite portion of the rim of the flange. Thereupon the mouth of the tube is centered upon the seat of flange 11. Once the mouth of the tube approximates a centered position, a downward pull on the tube will not effect its removal but will simply serve to increase the tightness of its sealed connection with the nipple 10.

Figures 3, 4, 5:
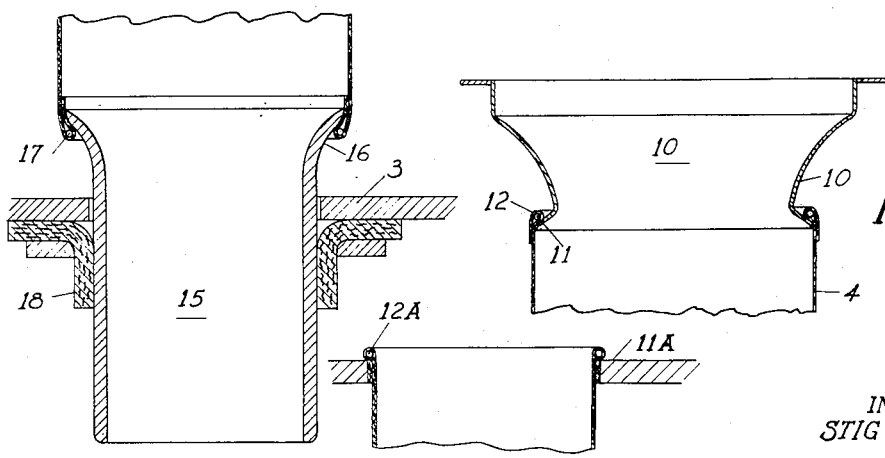
Figure 3 is a detail view of the means by which the upper end of the tube is connected to the header.
Figure 4 is a detail view of a modified form of connection for the upper end of the tube.
Figure 5 is a detail view of means connecting the lower end of the tube to the hopper.

Figure 4 shows a reverse form of attachment for the upper end of the tube. In this case, the tube sheet of the header provides what may be called a circumferential flange 11A extending laterally inward and terminating in a rim which defines an air outlet opening of the header. The attachment ring 12A is made of a resilient material having self sustaining rigidity, such as spring steel, and a diameter slightly greater than the rim. The upper end of the tube is centered around the opening to rest on the inside of flange 11A. To remove it, the upper end of the tube is lifted, and the resilient ring 12A is flattened or compressed to an oval form permitting it to be slipped through the outlet opening. This structure is less desirable than that of Figure 3 because it subjects the fabric to the abrasive effect of the dust content of the air along an area, corresponding to the outlet opening of the header, where the air velocity is at a maximum.

In accordance with another feature of my invention, the bottom of each tube is yieldably connected to the hopper so as to accommodate the expansion and contraction of the tube and, at the same time, maintain it under uniform tension. While this can obviously be done in various ways, as by resilient means yieldably urging the lower end of the tube downwardly, I prefer to accomplish it by suitably weighting the lower end of each tube and slideably connecting it to the hopper.

Accordingly, the lower end of each tube is terminated above its hopper opening at an elevation equal to or greater than its maximum expansion and contraction movement. The tube is slideably connected to the hopper through the agency of a hollow weight, in the form of metal pipe 15, extending from the lower end of the tube downwardly through its hopper opening and having sufficient weight to maintain the tube under a desired degree of tension. The upper end of pipe weight 15 is flared outwardly to provide a flange 16 while the lower end of the tube is provided with an attachment ring 17 which reduces the bottom mouth of tube 4 to a diameter slightly smaller than the rim of the pipe weight flange 16. In other words, the lower end of the tube may be constructed and connected to the flange 16 of pipe weight 15 in the same manner as the upper end of the tube is constructed and connected to the flange 11 of the nipple 10.

It will be appreciated that the resilient or yieldable means for holding each tube under tension may be located at the upper end of each tube instead of the lower end. The location of the tube tensioning means at the lower end of each tube is preferred because this location lends itself to a wider variety of suitable arrangements as well as the simpler types of arrangements.

The pipe weight 15 extends downwardly through the appropriate hopper opening for a distance equal to or greater than the maximum expansion and contraction movement of the tube. A slideable sealed connection is provided between the pipe weight 15 and the hopper by means of a flexible tubular felt gasket 18 composed of felt, rubber or other flexible material and mounted on the hopper. Since the air pressure within the tubes and the hopper is the same, the pressure drop between the hopper interior and the atmosphere around the tubes will be the same as the pressure drop across the thickness of the tube fabric. Consequently, this pressure differential will serve to press the flexible gasket 18 into sealing relationship with the relatively moveable pipe weight 15.

While separate blow rings 5 may be used for each tube, each blow ring is preferably constructed to accommodate a group of tubes. Thus, in the structure illustrated, a bank of 16 tubes is employed with 4 separate blow ring structures, each accommodating 4 tubes. While these blow ring structures may be constructed in any suitable manner, the novel construction specifically disclosed herein is preferred because its simplicity renders it relatively inexpensive to make.

Each blow ring is composed of a pair of similarly fabricated upper and lower metal sheets 20, each sheet being stamped or otherwise processed to form a symmetrical group of four vertically-arranged inwardly-directed shallow cups 21, one for each tube, and a vertically arranged oppositely directed peripheral flange 22. The bottom of each cup is circularly blanked to produce a horizontally-arranged inwardly-directed annular flange 23 delimiting a tube-receiving opening having a diameter which is slightly smaller than the tube diameter. The fabricated sheets 20 are assembled in superposed relationship with their corresponding annular flanges 23, at the bottom of each cup slightly spaced from each other to form an annular jet nozzle 24 therebetween. This assembly is rigidly held in proper spaced relationship by a centrally disposed group of suitably secured spacers (not shown) and by a peripherally extending sheet metal wall 25 welded to the peripheral flanges 22 to hold those flanges in spaced relationship and close the space between them.

The operative relationship between a tube and the blow ring is clearly illustrated in Figure 7 where it will be noted that the annular air jetting opening 24 formed by the flanges 23 at the bottom of opposed cups 21 has a diameter somewhat smaller than the diameter of the tube. Consequently, the flanges 23 will press the tube inwardly at the area where the air jetting action takes place. This is desirable because it facilitates the dislodgement of the dust accumulation by bending the fabric inwardly and thus tending to open its inner surface pores. This, of course, is conventional in this art.

In accordance with another feature of my invention, the frictional contact between the blow ring and the tube is limited to the nozzle portion of the blow ring in order to reduce the wear on the tube. This is accomplished by making the diameter of the cup 21 substantially larger than the inflated diameter of each tube. Any tendency of the high pressure air jet to blow the tube fabric inwardly away from its contact with the nozzle forming flanges 23 is overcome by the tension which pipe weight 15 exerts on the tube. For example a weight of 21 pounds produces adequate tension in the tube to prevent it from being blown inwardly away from the nozzle when the nozzle pressure is 13½ inches water gauge greater than the 4½ inches of water gauge pressure within the tube.

Another feature of this invention resides in the counterbalanced mounting of the blow rings. Each blow ring is counterbalanced to reduce the power required to reciprocate it. While this may be accomplished by the use of any counterweight, it is simply and advantageously accomplished here by using one blow ring to counterbalance another. Accordingly, the blow rings are connected together in pairs by means of a chain 30 extending from the top center of one blow ring to the other and connected at its ends to each. This chain is supported above the header on a pair of laterally spaced pulleys 31—32 carried by shafts 33—34. The vertical runs of chain 30, in passing downwardly to their respective blow rings, extend through metal conduits 35—36 respectively, which provide chain passageways going entirely through the header.

With one blow ring counterbalancing another, the drive mechanism necessarily must move one blow ring of each pair upwardly (say 12 feet per minute) while it moves the other blow ring of that same pair correspondingly downward. This drive means includes a motor 40 connected through a speed reducer 41 and sprocket chain 42 to one of the pulley shafts 33—34; such shaft being connected by gear chain 43 to the other pulley shaft. The chain 43 between pulleys 33—34 may be omitted.

To reverse the drive at the end of each upstroke, each vertical run of the chain 30 carries a switch actuating element 45 which is positioned on the chain to emerge upwardly out of its conduit 35 or 36, at the end of the corresponding upstroke. Upon emergence, the element 45 actuates a motor reversing switch 46 through a pair of interconnected linkages, one for each run of the chain. Each of these linkages comprises: an L-shaped lever 47, the heel of which is pivotally mounted at 48 on the top of the collector in position to place its foot adjacent the opening of the corresponding conduit 35 or 36; a U bolt 49 projecting from the foot of said conduit opening to encircle the chain 30; and an arm 50 pivotally connected at one end to the upper end of the leg of L-shaped lever 47 and at its other end to the corresponding arm 50 of the other linkage. The motor reversing switch 46 can be mounted at any suitable point on either linkage. However, as illustrated, it is mounted on the foot of an L-shaped arm 51, the heel of which is pivotally mounted on the collector at 52 and the leg of which is pivotally connected at its upper end to the common connection of linkage arms 50.

The high pressure gas supply means includes a T 55 having an inlet opening for connection to a suitable source of gas and a pair of outlet openings, one connected through pipe 56 and branches 57 to all blow rings which move in the one direction at the same time and the other connected through pipes 58 and branches 59 to the other blow rings. Each branch connection contains a rigid section 60 extending downwardly through the header to a point midway of the length of the filter tubes and a flexible section 61 extending from the lower end of the rigid section to the bottom center of its blow ring where it connects into the blow ring.

High pressure gas may be continuously supplied to all blow rings during both strokes. Where it is desired to interrupt the flow of gas to the blow rings during the upstrokes, a valve 65 may be arranged within T 55 and mounted on the heel pivot 52 of L-shaped lever 51 in position to close pipe 56 during the upstroke of all blow rings which are connected thereto and to close pipe 58 during the upstroke of the blow rings connected to it. It will be understood that valve 65 will be moved automatically by the interconnected linkages and that when it closes one pipe it automatically opens the other to the gas supply.

Having described my invention I claim:

1. In a blow ring for an inflated filter tube of known outside diameter: a hollow structure having vertically spaced top and bottom metal walls and a peripheral metal wall cooperating to define an inner closed chamber for receiving gas under pressure, the top and bottom walls each containing an annular cup-shaped depression extending into said chamber, each cup-shaped depression having a washer-like bottom providing an outer annular bottom flange encircling a central bottom opening of smaller diameter than said filter tube diameter, said cup-shaped depressions being directed toward and aligned with each other and cooperating to form a tubular passageway through which said filter tube is adapted to extend, the washer-like flanges of their bottoms being spaced from each other to form therebetween an annular nozzle for jetting gas from said closed pressure chamber into a filter tube passing through said passageway.

2. In the blow ring of claim 1 wherein: the inside diameter of each cup-shaped depression is substantially larger than the outside diameter of the tube so that contact between the tube and the ring is substantially limited to the nozzle at said bottom opening.

3. In a dust collector of the class described: a blow ring as defined in claim 1; and a filter tube extending through the passageway of said ring, the outside diameter of the tube being substantially larger than the diameter of said jet nozzle and substantially smaller than the diameter of each cup-shaped depression so that the contact of the tube with the ring is substantially limited to the nozzle at said bottom opening.

4. In the dust collector of claim 3: yieldable means for tensioning the tube to hold the tube in firm engagement with the annular jet nozzle and to maintain it out of engagement with the side walls of each cup-shaped depression.

5. A dust collector of the class described comprising: an upper gas inlet header; a lower dust hopper; a filter tube vertically arranged between header and hopper to receive dusty gas axially from the header, filter that gas as it passes radially outward through the tube fabric into the surrounding atmosphere and ultimately discharge the separated dust axially into the hopper; means connecting the upper and lower ends of the tube to the header and hopper respectively to support the tube on the header and to seal its communication with the header and hopper; a high pressure gas supply; a traversing reverse-jet blow ring connected to said supply, said ring providing a nozzle encircling the tube and being operative to direct an annular jet of high pressure gas radially inward through the tube fabric into the interior of the tube to dislodge dust deposited on the inner face of the tube, said blow ring having walls forming tubular passageways on opposite sides of said nozzle and concentric to the axis thereof, said passageways being of a diameter larger than the diameter of the tube passing through said nozzle, the nozzle diameter being smaller than said filter tube diameter; drive means for reciprocating the blow ring upwardly and downwardly along the tube; and yieldable means tensioning the tube longitudinally.

6. The collector of claim 5 wherein: said connecting means includes a lower tubular connector which is relatively heavy in weight and operative as said yieldable means.

References Cited in the file of this patent

UNITED STATES PATENTS

| | | |
|---|---|---|
| 1,703,681 | Miller | Feb. 26, 1929 |
| 2,010,898 | Ruemelin | Aug. 13, 1935 |
| 2,079,315 | Dickerson | May 4, 1937 |
| 2,308,309 | Ruemelin et al. | Jan. 12, 1943 |
| 2,552,191 | Lang | May 8, 1951 |
| 2,661,079 | Osgood et al. | Dec. 1, 1953 |

FOREIGN PATENTS

| | | |
|---|---|---|
| 331,088 | Germany | of 1921 |
| 488,129 | Great Britain | July 1, 1938 |
| 575,877 | Great Britain | of 1946 |